Dec. 7, 1948.  R. F. HAYS, JR  2,455,364
SELSYN-CONTROLLED SERVO SYSTEM
Filed Dec. 10, 1942  3 Sheets-Sheet 1

INVENTOR
R. F. HAYS, JR.
BY
Herbert N. Thompson
his ATTORNEY

Dec. 7, 1948.   R. F. HAYS, JR   2,455,364
SELSYN-CONTROLLED SERVO SYSTEM
Filed Dec. 10, 1942   3 Sheets-Sheet 3

INVENTOR
R. F. HAYS, JR.
BY
*Herbert H. Thompson*
his ATTORNEY

Patented Dec. 7, 1948

2,455,364

UNITED STATES PATENT OFFICE 2,455,364

SELSYN-CONTROLLED SERVO SYSTEM

Robert F. Hays, Jr., Syosset, N. Y., assignor to The Sperry Corporation, a corporation of Delaware Application December 10, 1942, Serial No. 468,600

13 Claims. (Cl. 318—30)

This invention relates generally to remote electrical position control systems wherein a pair of signal voltage transmitters or synchronous generators operating in different speed ratios, that is, a fine or high speed transmitter and a coarse or low speed transmitter are employed at the controlling end of the system to generate and transmit control signal voltages corresponding to the position of a controlling object, and a pair of associated receivers are employed at the remotely controlled end of the system for receiving said signals and introducing the same into a servo follow-up system, said servo follow-up system operating to position a controlled object in substantial synchronism with the controlling object, and the invention has reference, more particularly, to means for substantially reducing the synchro errors, that is the errors introduced solely by the synchronous transmitting and receiving elements of such a remote control system.

In order to obtain great accuracy of reproduction by the controlled object, that is, substantial synchronism of the objects, it is necessary to employ a fine or high speed signal voltage transmitter and connected receiver channel. This high speed channel may operate in a ratio for example, of 35:1, providing one channel of the synchro transmission system. The other channel of the transmission system is ordinarily connected in a 1:1 ratio, inasmuch as the objects may get out of step any amount from zero to 180° in either direction, due for example, to the turning of the controlling object when the system is not energized.

In order to prevent the inherent error in the coarse synchro transmission channel from effecting an error in the final position of the controlled object, it is desirable to control the servo follow-up system solely from the fine receiver during such times as the objects are nearly in synchronism. On the other hand, whenever there is more than a certain angular displacement between the objects, it is necessary that the servo system be controlled, primarily at least, from the coarse receiver in order to prevent the controlled object from locking in at erroneous positions corresponding to synchronism between the rotor of the fine transmitter and that of the fine receiver.

The above described selective control of the servo follow-up system has been accomplished in the past by a system employing a relay-controlled switch, in the normal position of which the fine receiver alone controls the servo follow-up system. In such a system, the relay-controlled switch is actuated from the output of an electron tube amplifier, the input to which is supplied from the coarse receiver. Thus, whenever the coarse receiver becomes more than 3 or 4° out of synchronism (for the particular speed ratio suggested above), the relay becomes sufficiently energized to operate, and in this way the control of the servo system is transferred from the fine to the coarse receiver.

It is seen that in the above described system an electron tube amplifier and a relay-controlled switch are required. In the system of the present invention it is proposed to effectively accomplish the same selective control of the servo follow-up system by employing two simple voltage limiters and an associated resistor for each in place of the relay-controlled switch and electron tube amplifier of the previously used system, thus eliminating the unreliability inherent in electron tubes and relays. The system of the present invention therefore has the advantage of simplicity and reliability not present in previously known systems.

Accordingly, the principal object of the present invention is to provide a sensitive remote positional control system in which the synchro transmission error is reduced to a minimum.

Another object of the invention is to provide, in a remote positional control system employing both a high and low speed synchro transmission channel, simple and reliable means for substantially eliminating the error which otherwise would be contributed by the low speed channel.

A further object of the invention is to provide novel means in a remote positional control system wherein a follow-up servo system is under the control of a coarse and a fine synchronous receiver, for rendering ineffective the control of the coarse receiver during such times as the system is substantially in synchronism.

Another object of the invention is to provide simple and reliable means in an electrical system wherein a control is maintained by two voltages, for transferring said control to one or the other of said voltages depending on the magnitudes of the same.

Other objects and advantages will become apparent from the specification, taken in connection with the accompanying drawings wherein one embodiment of the invention is illustrated.

In the drawings.

Similar characters of reference are used in all of the above figures to indicate corresponding parts.

Figure 1:
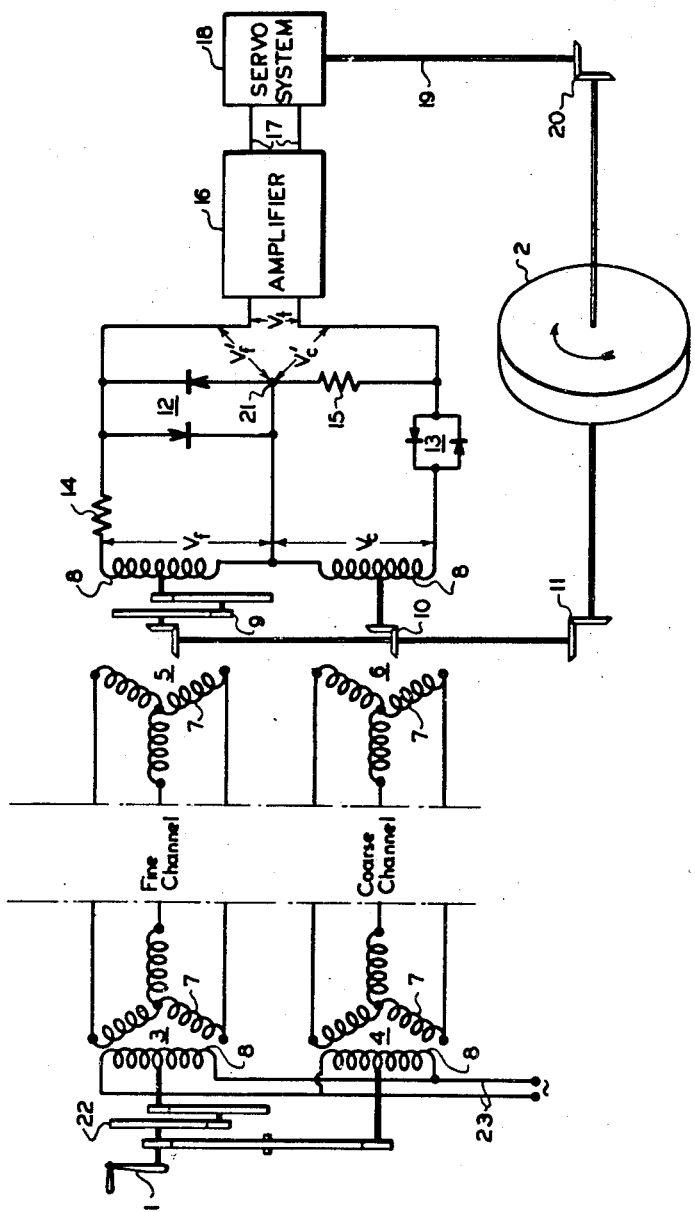
Fig. 1 is a schematic representation illustrating one embodiment of the invention.

Referring now to Fig. 1 of the drawings, the controlling object 1 is illustrated as a handwheel although the same might be any low power turned object, such as a telescope, the angular position of which is to be accurately and immediately repeated by a controlled object 2, which may be a ponderable turnable object. The high and low speed transmitting devices 3 and 4 and their remote connected receiving devices 5 and 6, constituting a synchronizing circuit, may be of any suitable type. Preferably, these devices are of the alternating current self-synchronous type in which the transmitting and receiving devices are similar in construction and are each provided with a poly-circuit armature winding 7 physically similar to a three-phase star-connected armature winding. This armature winding may be mounted on the stator, while the field winding 8 is on the rotor. In connecting each receiving device to its respective transmitting device three conductors are used by means of which like points of the two armature windings 7 of the devices are inter-connected. The field windings 8 of the transmitters are connected to a suitable source of alternating current supply fed through the single phase leads 23. Field winding 8 of the high speed transmitter 3 is connected to handwheel 1 through reduction gearing 22 to provide a higher speed of rotation or greater angular displacement of field windings 8 than the speed or displacement of handwheel 1, whereas field winding 8 of the low speed transmitter 4 is connected to turn at the same rate or through the same angular displacement as the handwheel 1.

Transmitter field windings 8 produce in their respective armature windings 7, alternating magnetic fields having positions in space corresponding to the spatial positions of windings 8. Any rotation of the transmitter field windings or rotors 8, caused by angular movement of the handwheel 1, produces a corresponding angular shifting of the axes of the magnetic fields of their respective armature windings, resulting in a corresponding shifting of the fields of the armature windings 7 of the receivers 5 and 6. Since the field windings or rotors 8 of the receivers 5 and 6 are mechanically connected through gearing 9, 10 and 11 to the controlled object 2, alternating voltages are induced in these field windings 8, the values of which voltages are substantially proportional to the angular displacement between the handwheel 1 and object 2, that is, for small angular displacements, and the phase of which voltages reverse with a reversal of the relative displacement between the handwheel and driven object.

The voltage ($V_f$) induced in the field winding 8 of the fine receiver 5 is applied across an impedance 14 and a voltage limiter 12 connected in series. Similarly, the voltage ($V_c$) induced in the field winding 8 of the coarse receiver 6 is applied across an impedance 15 and a voltage limiter 13, also connected in series. The voltage limiters 12 and 13 may be non-linear resistors made up, for example, of selenium or copper oxide discs connected back to back so as to pass alternating current. The use of this type of voltage limiter is disclosed in copending application Serial No. 41,851, for a Positional control system, filed September 24, 1935, now Patent No. 2,414,384, issued January 14, 1947, in the name of Francis L. Moseley. It will be understood, however, that the invention is not restricted to the use of non-linear resistors for the voltage limiters 12 and 13, but that any suitable type of non-linear circuit element adapted to limit a voltage may be employed. Among the devices suitable for such a purpose are electron discharge devices, such as a glow tube, rectifier tubes in series with a bias voltage, amplifiers biased to cut-off, saturable reactors, varistors, and thermistors.

The voltage ($V_t$), which is actually used as the servo control voltage, is composed of the voltage ($V'_f$) across limiter 12 and the voltage ($V'_c$) across impedance 15, connected in series, as at point 21. The voltage ($V_t$) is fed to an amplifier 16, which amplifies the same, and produces in its output leads 17 a voltage suitable as an input to the particular type of servo system 18, which is employed. The servo system 18 may be of any suitable type, electrical or mechanical, adapted to produce a rate of rotation of its output shaft 19 corresponding in magnitude and direction to the amplitude and phase of the control voltage ($V_t$). The controlled object 2 is then actuated from shaft 19 through gearing 20. It will thus be seen that the servo system 18 will operate to rotate the controlled object 2 and the rotors 8 of the receivers 5 and 6 until a position is reached at which the control voltage ($V_t$) is zero, the controlled object 2 then being in synchronism with the handwheel 1. It will be understood that the servo system 18 may include well-known anti-lag and anti-hunt features, if desired.

Figure 2:
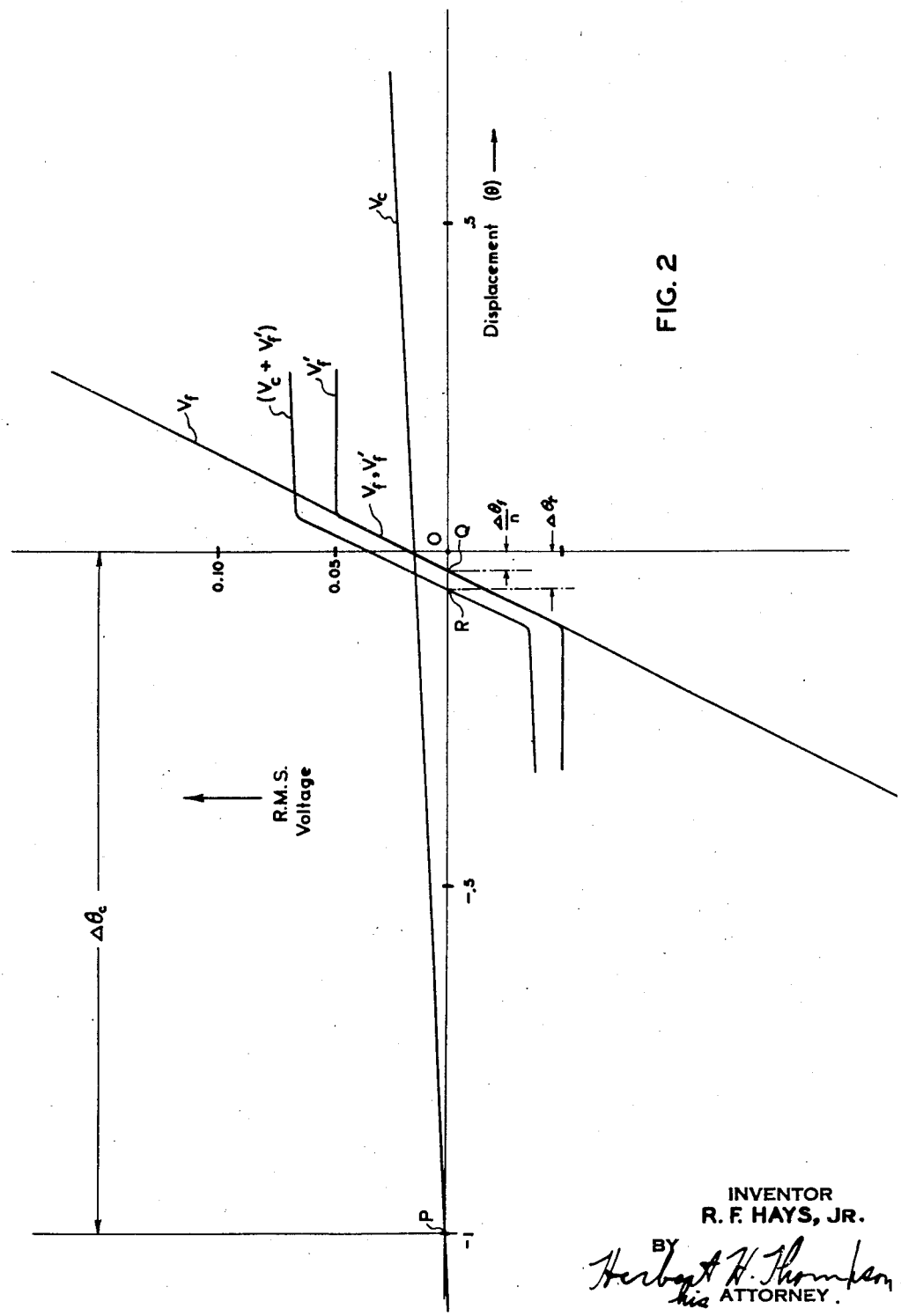
Fig. 2 is a diagram illustrating the synchro errors likely to arise in a remote positional control system employing both a low and a high speed synchro transmission channel.
Figure 3A:
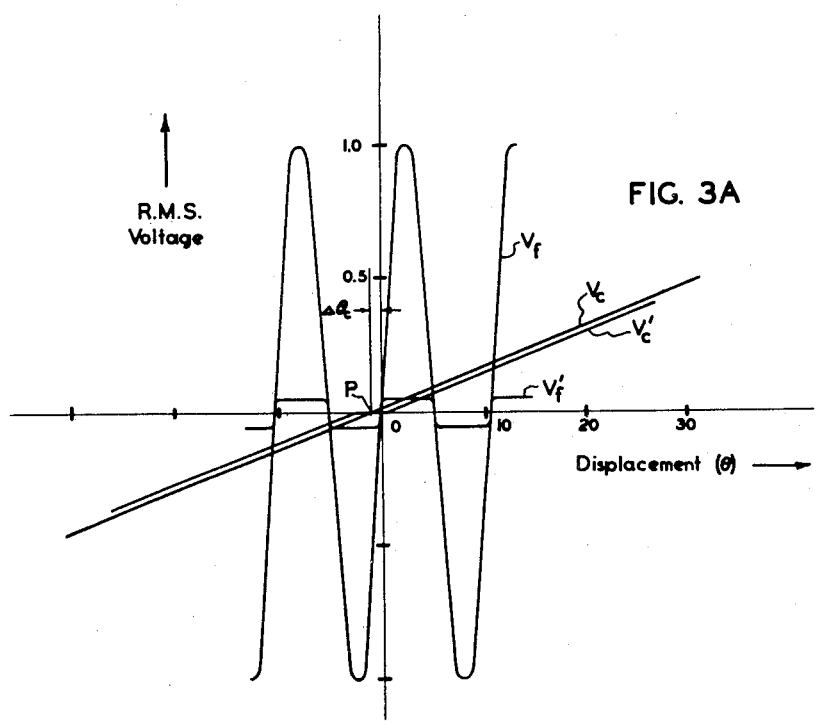
Figs. 3A and 3B are diagrams illustrating the output potentials involved in the synchronous receiver circuits of Fig. 1.
Figure 3B:
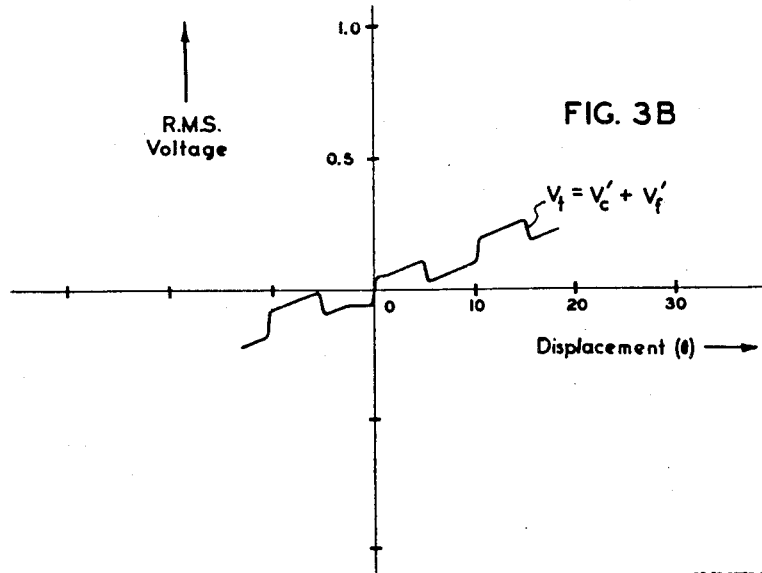

In any synchro transmitter-receiver system, there exists an inherent and erratic error due to imperfections in the synchro devices themselves. These errors are clearly brought out in Fig. 2, where the voltages ($V_c$, $V_f$) induced in the rotors of the coarse and fine receivers, respectively, are plotted to a unity scale factor against the angular displacement ($\theta$) of the controlled object 2 with respect to the controlling object 1. In Figs. 2 and 3A and 3B, it will be understood that voltages plotted above the zero voltage axis represent positive phase voltages, and voltages plotted below the zero axis represent the opposite or negative phase voltages. As shown in Fig. 2, and in general, neither the coarse receiver voltage ($V_c$), nor the fine receiver voltage ($V_f$), will be exactly zero at zero angular displacement ($\theta$). The coarse receiver will have its zero voltage position at the same point P displaced an amount $\Delta\theta_c$ from the true zero displacement position, and similarly, the fine receiver will have its zero voltage position at some point Q displaced from the zero displacement position an amount $$\frac{\Delta\theta_f}{n}$$

where $n$ is the speed ratio of the fine transmission channel. Thus, if the servo system 18 were controlled from the coarse receiver alone, the total error in the system would be $\Delta\theta_c$, and if the servo system were controlled from the fine receiver alone, the total error would be $$\frac{\Delta\theta_f}{n}$$

These inherent errors in synchro transmitter-receiver systems are erratic, and vary with the spatial positions of the rotors 8. It is assumed that $\Delta\theta_c$ and $\Delta\theta_f$ are the maximum errors inherent in the synchro transmitter-receiver systems employed, so that Fig. 2 represents the worst possible condition. It is also assumed in the drawings that $\Delta\theta_c$ and $\Delta\theta_f$ are equal.

Where both a coarse and fine synchro channel are employed in order to obtain greater accuracy, it is customary to employ a voltage limiter 12 in conjunction with the fine receiver 5, as shown in Fig. 1, and to control the servo system 18 from the series sum of the voltage ($V'_f$) across the limiter 12 and the voltage ($V_c$) induced in the rotor 8 of the coarse receiver 6, that is, the voltage controlling the servo system 18 would be equal to the voltage ($V'_f + V_c$).

In such a system, the voltage limiter 12 is necessary in order to eliminate the undesired zero voltage points which would otherwise occur, and thus to prevent the system from erroneously locking in at these points. Its effect is to lop off the peaks of the voltage ($V_f$), resulting in the flat topped voltage form ($V'_f$), as shown in Fig. 2 and, on a smaller scale, in Fig. 3A. For satisfactory operation $V'_f$ must never exceed $V_c$ at a time when the two are in opposite phase. This restriction determines the extent to which $V_f$ must be flattened, and also imposes the condition that the speed ratio ($n$) be an odd number, so that when $V_c$ again goes through zero, at 180° displacement, there can be no possibility of a stable equilibrium position resulting from the control influence exerted by the fine receiver.

Referring again to Fig. 2 in order to examine the errors in the above described customary system wherein the servo system is controlled by the voltage ($V_c + V'_f$), it will be obvious that equilibrium will be reached at some point R where the voltages $V_c$ and $V'_f$ are equal and opposite, and that the total error will be $\Delta\theta_t$. It can be seen that the total error ($\Delta\theta_t$) may be considered as made of two components, the first component being the error $$\frac{\Delta\theta_f}{n}$$

contributed by the fine selsyn itself, and the second component being the error reflected from $\Delta\theta_c$. The latter component will readily be seen to be very slightly smaller than $$\frac{\Delta\theta_f}{n}$$

Upon a mathematical analysis, the following formula for the total error $\Delta\theta_t$ in such a system may be derived:

$$\Delta\theta_t = \frac{\Delta\theta_c + \Delta\theta_f}{n+1}$$

It is the function of the system of the present invention to eliminate from the total error ($\Delta\theta_t$) that portion reflected from the coarse synchro channel, that is, the second component of $\Delta\theta_t$ referred to above. By an inspection of Fig. 2, it is apparent that this coarse synchro error component would be eliminated if the coarse receiver voltage ($V_c$) were substantially zero near the zero displacement position.

The present inventor has conceived a simple and direct manner of effectively accomplishing this result by inserting in series with the field winding 8 of the coarse receiver 6, a voltage limiter 13 and an impedance 15, as shown in Fig. 1. The voltage ($V'_c$) across the impedance will then be as shown in Fig. 3A. Thus, $V'_c$ will substantially follow $V_c$ except at the low values of $V_c$, at which times $V_c$ will be completely used up across the voltage limiter 13, and the voltage ($V'_c$) across resistor 15 will be substantially zero.

The voltage ($V_t$) employed to control the servo system 18 in the present invention is the series sum of $V'_c$ and $V'_f$. This voltage ($V_t$) is shown plotted against displacement ($\theta$) in Fig. 3B. Since $V'_c$ is substantially zero within three or four degrees either side of the zero displacement position, it is obvious that the system of the present invention will reach equilibrium at the point Q of Fig. 2 instead of the point R.

In the present system, therefore, the total error ($\theta\Delta_t$) comprises only the component contributed by the fine synchro transmission channel, that is, $$\frac{\Delta\theta_f}{n}$$

the component contributed by the coarse channel having been eliminated. Thus, the total error ($\theta\Delta_t$) is reduced by approximately one half, where $\theta\Delta_c$ and $\theta\Delta_f$ are equal.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A positional control system of the character described comprising, a controlling object, a controlled object and voltage controlled means for driving said controlled object, an electrical circuit for controlling said driving means, said electrical circuit comprising means for producing an alternating potential responsive to the relative displacement of said controlled object with respect to said controlling object, means for modifying the relationship between said potential and said relative displacement to maintain said potential substantially at zero until said relative displacement exceeds a predetermined value, and means for introducing said modified voltage into said driving means.

2. Apparatus as claimed in claim 1, wherein said modifying means consists of a voltage limiter and an impedance.

3. In a positional control system of the character described, in combination, controlling and controlled objects, a voltage controlled servo system for driving said controlled object, high speed and low speed transmitters operated from said controlling object, high speed and low speed receivers electrically connected to said transmitters and mechanically connected to said controlled object, said receivers each having a voltage output, and a voltage limiter connected in the output circuit of each of said receivers for modifying the output voltage of each of said receivers, said modified voltages supplying the control signal voltage input for said servo control system.

4. A positional control system of the character described comprising, a controlling object, a controlled object and means for driving said controlled object, an electrical circuit for controlling said driving means, said electrical circuit including means for producing two alternating potentials responsive in different manners to the relative displacement of said controlled object with respect to said controlling object, voltage limiter means for modifying the first of said potentials to maintain said first potential substantially at zero until said relative displacement exceeds a predetermined value, additional voltage limiter means for modifying the second of said potentials to remove the top portions of said second potential, means for additively combining said modified potentials, and means for applying said combination voltage to said driving means, thereby controlling the same.

5. A positional control system of the character described comprising, a controlling object, a controlled object and means for driving said controlled object, an electrical circuit for controlling said driving means, said electrical circuit including means for producing two alternating potentials responsive in different manners to the relative displacement of said controlled object with respect to said controlling object, voltage limiter means for modifying each of said potentials according to their respective magnitudes, and means for introducing into said driving means the series sum of said modified voltages.

6. A position control system of the character described, comprising a plurality of objects arranged to move in synchronism and synchronizing means interconnecting said objects, said synchronizing means comprising a high and low speed transmitter-receiver channel for setting up two alternating potentials differently responsive to the departure of said objects from synchronism, means differently responsive to the magnitude of each of said potentials for modifying each of said potentials, and means responsive to the algebraic sum of said modified potentials for causing said objects to return to synchronism.

7. A position control system of the character described, comprising a plurality of objects arranged to move in synchronism and synchronizing means interconnecting said objects, said synchronizing means comprising a high and low speed transmitter-receiver channel for setting up two alternating potentials differently responsive to the departure of said objects from synchronism, means for deriving from the first of said potentials a third potential, said third potential being substantially zero at small values of said first potential and corresponding to said first potential at higher values of said first potential, means for deriving from the second of said potentials a fourth potential, said fourth potential corresponding to said second potential but having a maximum or limiting value, and means responsive to the algebraic sum of said third and fourth potentials for causing said objects to return to synchronism.

8. A position control system of the character described comprising a controlling object, a controlled object, a high speed and a low speed transmitter-receiver channel for setting up two control voltages differently responsive to the angular displacement of one of said objects with respect to the other, servo means responsive to said control voltages for positioning said controlled object, means for limiting the control influence exerted by one of said control voltages, and means for completely eliminating the control influence exerted by the other of said control voltages during such times as said objects are substantially in synchronism.

9. A position control system comprising a controlled object, a controlling object, high speed and low speed transmitters operated from said controlling object, high speed and low speed receivers electrically connected to said transmitters and mechanically connected to said controlled object, each of said receivers being adapted to produce an alternating potential differently responsive to the angular displacement of said controlled object with respect to said controlling object, a modifying electrical circuit associated with and energized from each of said receiver potentials, said electrical circuits each consisting of a voltage limiting device and an impedance, means for additively combining the potential developed across the impedance associated with said low speed receiver and the potential developed across the voltage limiter associated with said high speed receiver, and means responsive to said combination potential for positioning said controlled object.

10. In an electrical control system wherein two voltages are employed to provide a single control, and wherein the first of said voltages alone would render a proper but inaccurate control over the whole range of the system, and the second of said voltages alone would render an improper control over a large portion of the range of the system but a proper and highly accurate control over the small critical range of the system, means for rendering the first of said voltages ineffective over the small critical range of the system, and means for rendering the second of said voltages ineffective over the remainder of the range of the system.

11. Apparatus as claimed in claim 10, wherein each of said means comprises a series circuit consisting of a voltage limiter and an impedance.

12. In an electrical control system wherein two signal voltages are produced, the first of said voltages providing a proper signal over the major portion of the range of the system and the second of said voltages providing a highly accurate signal over the remaining critical range of the system, means for limiting said first voltage over said small critical range to a value negligible as compared to said second voltage, means for limiting said second voltage to a predetermined value, a voltage controlled servo system, and means for applying the series sum of said two limiting voltages to said servo system.

13. Apparatus as claimed in claim 12, wherein each of said limiting means consists of a voltage limiter and an impedance.

ROBERT F. HAYS, Jr.

No references cited.

Certificate of Correction

Patent No. 2,455,364.  December 7, 1948.

ROBERT F. HAYS, Jr.

It is hereby certified that errors appear in the printed specification of the above numbered patent requiring correction as follows:

Column 6, line 23, for "$\theta\Delta_t$" read $\Delta\theta_t$; line 24, same column, for "$\theta\Delta_c$ and $\theta\Delta_t$" read $\Delta\theta_c$ and $\Delta\theta_f$;

and that the said Letters Patent should be read with these corrections therein that the same may conform to the record of the case in the Patent Office.

Signed and sealed this 28th day of June, A. D. 1949.

[SEAL]

THOMAS F. MURPHY,
*Assistant Commissioner of Patents.*